(No Model.)
J. J. CULBERTSON, J. C. O'CONNELL & B. GASTON.
BOX FOR MEAT AND OIL PRESSES.
No. 318,875. Patented May 26, 1885.
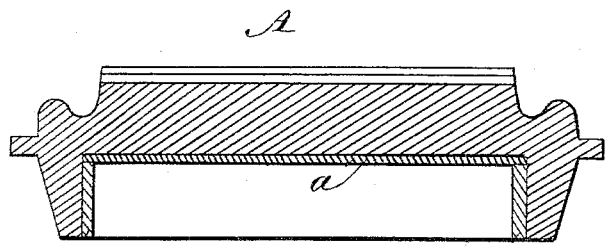
WITNESSES:
C. Neveux
C. Sedgwick
INVENTOR:
J. J. Culbertson
B. Gaston
BY J. C. O'Connell
Munn & Co
ATTORNEYS.

UNITED STATES PATENT OFFICE.

JOHN J. CULBERTSON, OF PARIS, TEXAS, JOHN C. O'CONNELL, OF MONTGOMERY, ALABAMA, AND BERNARD GASTON, OF PARIS, TEXAS.

BOX FOR MEAT AND OIL PRESSES.

SPECIFICATION forming part of Letters Patent No. 318,875, dated May 26, 1885.

Application filed March 11, 1885. (No model.)

*To all whom it may concern:*

Be it known that we, JOHN J. CULBERTSON and BERNARD GASTON, of Paris, Lamar county, Texas, and JOHN C. O'CONNELL, of Montgomery, Montgomery county, Alabama, have invented certain new and useful Improvements in Boxes or Receptacles for Meat and Oil Presses, of which the following is a full, clear, and exact description.

Our invention relates to the boxes or receptacles for meats and presses for extracting the oil from cotton and other seeds; and our invention consists in providing the box or receptacle with a lining, preferably of sheet metal, to prevent adherence of meat to the box or receptacle, which is liable to accumulate and harden and cause breakage of the box or receptacle.

Reference is to be had to the accompanying drawing, forming part of this specification, in which the figure is a sectional elevation of an oil-box or receptacle for meats having the invention applied thereto.

In the drawing, A is the box or receptacle. Within the press box or receptacle A is placed the lining $a$, which is, by preference, sheet-brass, and serves to prevent the meats from adhering to and accumulating upon the upper part of the box or receptacle, thus avoiding the danger of breaking the box or receptacle for meats.

Having thus described our invention, we claim as new and desire to secure by Letters Patent—

The press and meat box or receptacle A, provided with the lining $a$, placed in the box to prevent accumulation of meat in the box, substantially as described.

JOHN J. CULBERTSON.
JOHN C. O'CONNELL.
BERNARD GASTON.

Witnesses:
B. J. BALDWIN, Jr.,
GEO. BALDWIN.